United States Patent [19]

Makita

[11] Patent Number: 5,611,034
[45] Date of Patent: Mar. 11, 1997

[54] METHOD FOR MAKING A GRAPH BY SELECTING ONE OF A PLURALITY OF GRAPH FORMS THAT BEST FIT A USER'S DATA FORMAT

[75] Inventor: Masaru Makita, Yachiyo, Japan

[73] Assignee: Canon Kabushiki Kaisha, Tokyo, Japan

[21] Appl. No.: 842,707

[22] Filed: Feb. 27, 1992

[30] Foreign Application Priority Data

Feb. 27, 1991 [JP] Japan .................................. 3-032851
Feb. 26, 1992 [JP] Japan .................................. 4-039744

[51] Int. Cl.⁶ ................................................ G06T 11/00
[52] U.S. Cl. ................................................ 395/140
[58] Field of Search .......................... 395/140, 144–148, 395/155, 156, 133, 135; 340/722, 734

[56] References Cited

U.S. PATENT DOCUMENTS 4,723,211  2/1988  Barker et al. ........................... 395/147
4,800,510  1/1989  Vinberg et al. .......................... 395/140

*Primary Examiner*—Almis R. Jankus
*Attorney, Agent, or Firm*—Fitzpatrick, Cella, Harper & Scinto

[57] ABSTRACT

A method of making a graph by selecting one of a plurality of graph forms that best fits a user's data format. The user's data is prepared in a table format, with a determination being made relative to which graph form best fits the prepared data. A graph form is selected based on the best fit, and the remaining graph forms are suppressed. The graph is then formulated on the selected graph form using the prepared data.

13 Claims, 19 Drawing Sheets

FIG. 8

| | A | B | C | D | E | ■→A ■↓01 |
|---|---|---|---|---|---|---|
| 1 | | | Product Market Sales Forecast | | | |
| 2 | | | | | | |
| 3 | Product | East | South | Midwest | West | |
| 4 | | | | | | |
| 5 | OP-220 | 225 | 209 | 146 | 96 | |
| 6 | OP-3350 | 100 | 134 | 168 | 128 | |
| 7 | OP-2200 | 15 | 5 | 3 | 12 | |
| 8 | | | | | | |
| 9 | | | | | | |

Move the cursor to beginning of block and press RETURN or press UNDO to cancel.

|1| |2| |3|Edit |4|Layout |5|Search |6|Block |7|Text |8| |9| |10|Setup

FIG. 9

```
■EDDDDDF ON ■KBI  ■  1  ■↓10  ■←07  ■↕01
↑         ↑        ↑   ↑      ↑
How our most popular product should fare in 1990.↙
The following table shows a breakdown of Product→    East→     South→    Midwest→   West↙
OP-220      225↑↑↑    209↑↑↑    146↑↑↑     96↙
OP-1350     100       134       168        128↙
OP-22200↑   15        5         3          12↙

The South and Midwest will definitely be
our largest growth areas.↙
↑ ↑↙■↑↑↙■↑↑↑↑↙■↵

|1|Create |2|File |3|Edit |4|Layout |5|Search |6|Block |7|Spread |8|Tools |9|Disk |10|Setup
```

|           | 1980 | 1982 | 1984 | 1986 | 1988 |
|-----------|------|------|------|------|------|
| A COUNTRY | 15.2 | 17.1 | 18.8 | 22.7 | 25.2 |
| B COUNTRY | 21.2 | 20.1 | 19.5 | 18.3 | 17.2 |
| C COUNTRY | 26.2 | 25.9 | 25.9 | 25.6 | 25.5 |
| D COUNTRY | 20.5 | 20.3 | 19.1 | 17.4 | 16.5 |
| E COUNTRY | 16.9 | 16.6 | 16.7 | 16.0 | 15.6 |

FIG. 12

|           | 1980 | 1982 | 1984 | 1986 | 1988 |
|-----------|------|------|------|------|------|
| A COUNTRY | 15.2 | 17.1 | 18.8 | 22.7 | 25.2 |
| B COUNTRY | 21.2 | 20.1 | 19.5 | 18.3 | 17.2 |
| C COUNTRY | 26.0 | 25.9 | 25.9 | 25.6 | 25.5 |
| D COUNTRY | 20.5 | 20.3 | 19.1 | 17.4 | 16.5 |
| E COUNTRY | 16.9 | 16.6 | 16.7 | 16.0 | 15.6 |

|          | 1980 | 1982 | 1984 | 1986 | 1988 |
|----------|------|------|------|------|------|
| A COUNTRY | 15.2 | 17.1 | 18.8 | 22.7 | 25.2 |
| B COUNTRY | 21.2 | 20.1 | 19.5 | 18.3 | 17.2 |
| C COUNTRY | 26.2 | 25.9 | 25.9 | 25.6 | 25.5 |
| D COUNTRY | 20.5 | 20.3 | 19.1 | 17.4 | 16.5 |
| E COUNTRY | 16.9 | 16.6 | 16.7 | 16.0 | 15.6 |

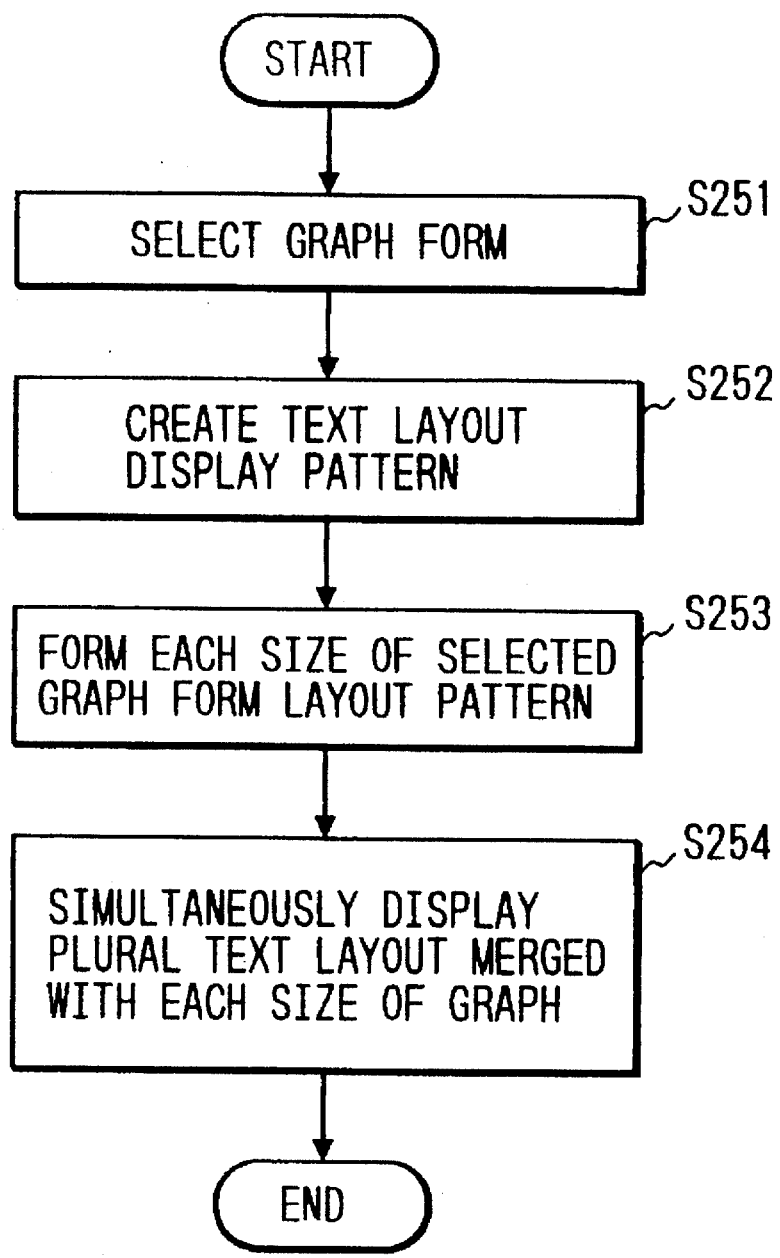

METHOD FOR MAKING A GRAPH BY SELECTING ONE OF A PLURALITY OF GRAPH FORMS THAT BEST FIT A USER'S DATA FORMAT

BACKGROUND OF THE INVENTION

1. Field of the Invention

The present invention relates to a method for making a graph for prepared data by selecting a desired form of a graph from a plurality of available graph forms.

2. Related Background Art

An apparatus such as a personal computer or a word processor which includes an application function for making a graph in the form of pie graph, bar graph or line graph based on data in chart format is known.

Certain apparatus of this type automatically analyzes data for display or prints it as a graph by causing a user to designate a range of the chart data to be represented by the graph, and sets an environment such as the form and size of the graph.

In prior art apparatus, however, even if the form of the graph which the user has designated is inappropriate to the designated range of the chart data to be represented by the graph, no measures are taken by the apparatus and a graph which is completely different from what the user has expected is drawn or no graph is drawn at all, a blank screen is displayed or a blank sheet is printed.

In order to avoid the above problem, a selection of the graph form which fits the chart data is required. This depends totally on the skill of the user.

Further, even if the graph form selected by the user is a usable one, it is not always the best graph to represent the chart data.

SUMMARY OF THE INVENTION

It is an object of the present invention to provide a method for making a graph which permits a user not skilled in making graphs to select a graph which fits the user's data format.

It is another object of the present invention to provide a method for making a graph which eliminates graph forms which are inappropriate for a given format, a graph from a plurality of graph forms provided as functions of an apparatus in a graph form selection step.

It is a further object of the present invention to provide a method for making a graph by displaying a layout image for each of a plurality of selectable graph forms in a graph form selection step such that a desired graph form is selected from the displayed layout images.

It is still a further object of the present invention to provide a method for making a graph by displaying a layout image for each of a plurality of selectable graph sizes in a graph size selection stage such that a desired graph size is selected from the displayed layout images.

According to one aspect of how the the present invention achieves these objectives relates to a method of making a graph by selecting a desired one of a plurality of graph forms comprising the steps of preparing data in a table format;

determining whether or not each of the graph forms fit the prepared data in the table format;

selecting a desired graph form while suppressing those graph forms of the plurality of graph forms which are determined not to fit; and executing the graph making in the selected graph form based on the prepared data.

According to another aspect of how the present invention achieves these objectives relates to a method of making a graph by selecting a desired one of a plurality of graph forms, comprising the steps of:

preparing data in a table format;

designating a range of prepared data in the table format to be graphed;

determining whether each of the graph forms fits the data format of the designated range;

selecting a desired graph form while suppressing those graph forms of the plurality of graph forms which are determined not to fit; and executing the graph making in the selected graph form based on the data of the designated range.

According to another aspect of how the invention achieves these objectives relates to a method of making a graph by selecting a desired one of a plurality of graph forms comprising the steps of:

preparing data in a table format;

recognizing a range of the prepared data in the table format to be graphed;

determining whether each of the graph forms fits the data format of the recognized range;

simultaneously displaying a plurality of layout images of those graph forms of the plurality of graph forms which are determined to fit;

permitting the selection of a desired graph form during the display; and executing the graph making in the selected form based on the data of the recognized range.

According to another aspect of how the present invention achieves these objectives relates to a method of printing a graph by selecting a desired one of a plurality of graph sizes, comprising:

setting a size of an output medium;

preparing data in a table format;

recognizing a range of the prepared data in the table format to be graphed;

simultaneously displaying a plurality of layout images to be outputted to the output medium of the selected size by the plurality of graph sizes based on the data in the recognized range, and;

permitting the selection of a desired graph size during the display; and executing the graph making of the selected size based on the data in the recognized range.

Other objectives and advantages besides those discussed above will be apparent to those skilled in the art from the description of a preferred embodiment of the invention which follows. In the description, reference is made to accompanying drawings, which form a part hereof, and which illustrate the invention. This, however, is not exhaustive of the various embodiments of the invention, and therefore reference is made to the claims which follow the description for determinating the scope of the invention.

BRIEF DESCRIPTION OF THE DRAWINGS

FIG. 8 shows an edit screen of the spreadsheet function,

FIG. 9 shows a screen for merging a chart into a text,

FIG. 11 shows a first example for setting a range in the spreadsheet function,

FIG. 12 shows a second example for setting a range in the spreadsheet function,

FIG. 25 shows a flow chart of a step for preparing display information for the selection of a graph size in a fourth embodiment.

DETAILED DESCRIPTION OF THE PREFERRED EMBODIMENTS

Embodiments of the present invention are now explained with reference to the drawings.

EMBODIMENT 1

Figure 1:
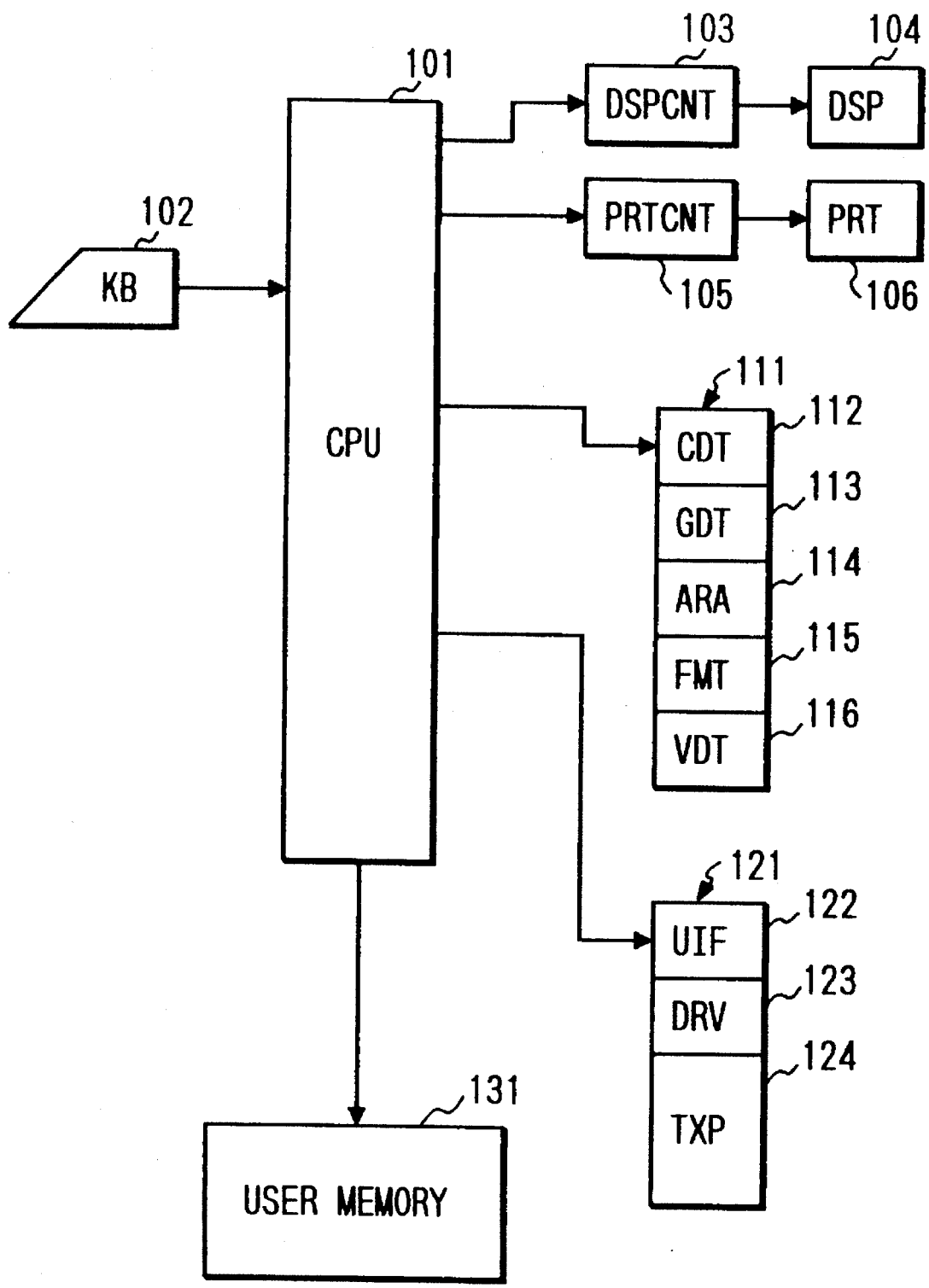
FIG. 1 shows a block diagram of one embodiment of the present invention.

FIG. 1 shows a block diagram of a word processor in one embodiment of the present invention. Numeral 101 denotes a central processing unit (CPU) which controls and manages an overall system. The control is accomplished by a control logic stored in a program memory to be described later to attain a high man-machine interface with a user. Numeral 102 denotes a keyboard (KB) which includes character keys for entering character data into the word processor of the present embodiment, various function keys and start and end keys.

Start and stop of entering chart data and settings of graph form, graph size and range of data are commanded through the keyboard (KB) 102.

The keyboard 102 is connected to the CPU 101 through a data bus and a control bus. When keys on the KB 102 are depressed, the CPU 101 responds thereto to detect the depressed keys of the KB 102.

Numeral 103 denotes a display controller (DSPCNT) which includes a word processor which converts a character code entered from the keyboard (KB) 102 into a chart data entry or a graph comment entry mode or to a character for display at a predetermined position on a display (DISP) 104.

A printer controller (PRTCNT) 105 controls a printer (PRT) 106 which commands printing to the printer 106 under the control of the CPU 101 in accordance with the settings of an underscored character, a decoration character such as bold face, a character size represented by point and character fonts.

Numeral 131 denotes a document memory (MEM) which manages text data of a user by titles thereof and reads and edits a newly prepared text or from an external memory medium such as a FD (not shown).

Numeral 111 denotes a memory stack prepared for work areas to execute various functions in the word processor of the present embodiment of the present invention.

Numeral 112 denotes chart data (CDT). A numerical string entered from the keyboard 102 is developed into data other than a character code to attain faster calculation and block processing. Graphic data (GDT) 113 has a work area for preparing a graph based on the entire or a portion of the chart data CDT 112, and a work area for flags required to control the operation.

An area memory area (ARA) 114 stores an address of the table data of the chart data (CDT) 112 which is to be represented by a graph. In practice, it is a table data address in a user memory (MEM) 131.

A format area (FMT) 115 is a work area for storing a text format in the user memory and an actual format at a cursor position under edition. The format of the text is determined by the format stored in the format area 115 and the editing and print are performed. A display data area (VDT) 116 stores data to be displayed in a form of a dot pattern.

The work area 111 also includes other information such as user-defined machine status, font under use and points of characters.

A control program for controlling the system is stored in a MEM 121 which is a read-only memory. It comprises a VIF 112 for controlling a user interface, a DRV 123 for controlling I/O and an external medium, and a TXP 124 for controlling the word processing.

A spreadsheet function and a graphing function which includes determination of areas of a graph and determination of fitness of graph forms are attained by the control program in the TXP 124.

Figure 2:
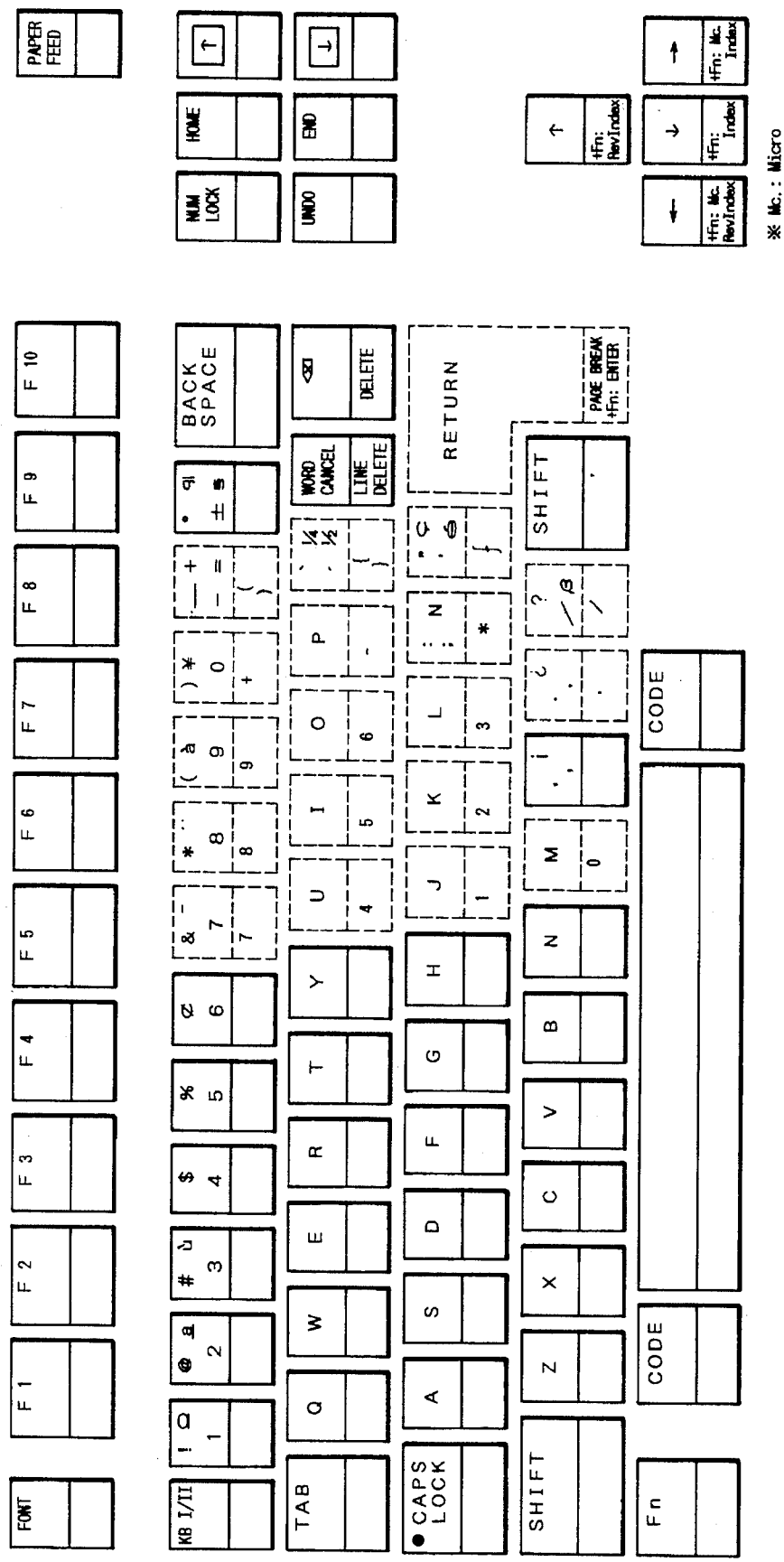
FIG. 2 shows a keyboard.

FIG. 2 shows a layout of keys of the entry keyboard (KB) 102 of the word processor in the embodiment of the present invention. A font key is used to set decoration of a character such as character font, size, mode and script. The user can select a desired character format by depressing the font key followed by a key F1–F5.

Keys F1–F10 are function keys which are user execution keys for executing functions in the document editing other than those designated by the font designation.

As shown, the keyboard comprises three parts, a set of character keys for entering characters, a set of function keys and a set of keys for paper handing and cursor movement. It realizes a very user-friendly key arrangement.

Figure 3:
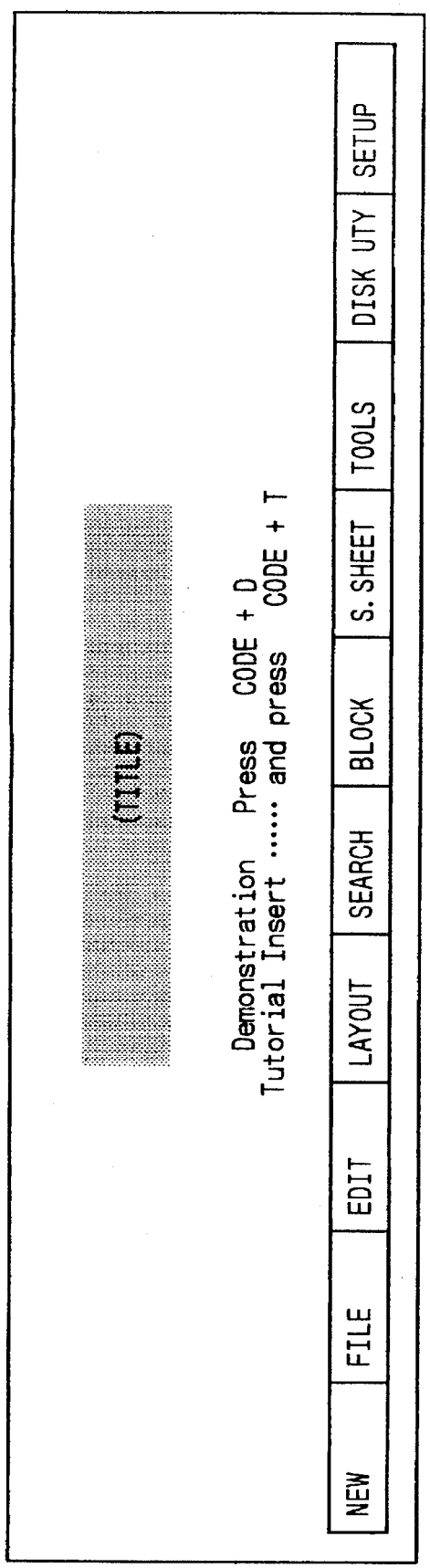
FIG. 3 shows a starting menu.

FIG. 3 shows a display screen immediately after power-on of the system. Menu cursors corresponding to the keys F1–F10 are displayed in NEW—SETUP to permit the selection of functions by the function keys. The user selects a desired function by the menu cursor to start the operation.

Figure 4:
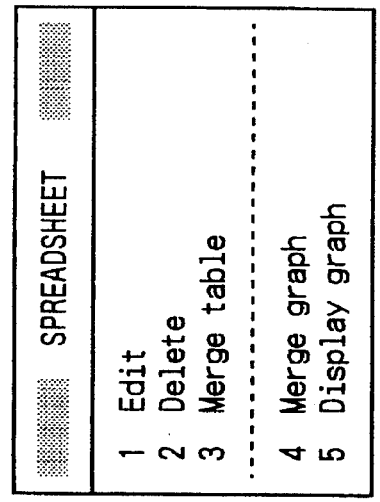
FIG. 4 shows a main menu of a spreadsheet function.

FIG. 4 shows a menu box of a spreadsheet function displayed in the present embodiment.

It comprises five items, "edit" for tabulation and editing, "delete" for deleting a file, "merge table" for merging a table into a text "merge graph" for merging a graph into a text, and "display graph" for setting a graph display mode. The functions in the chart are started and executed by the menu box.

Figure 5:
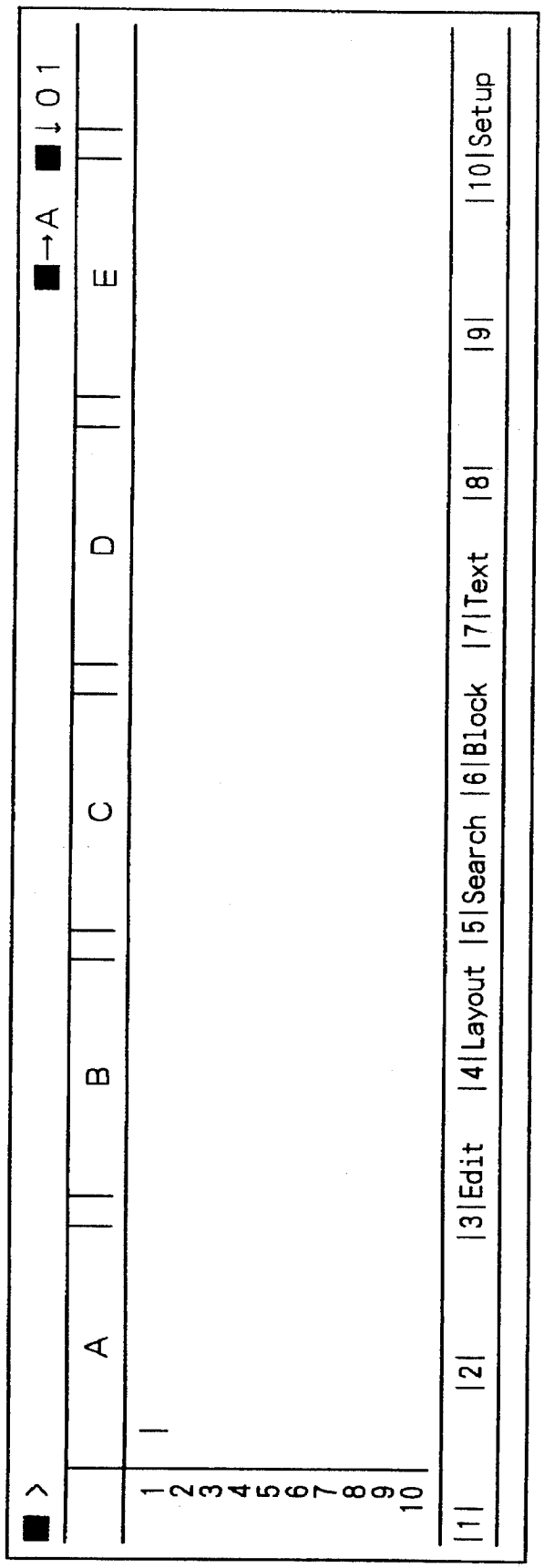
FIG. 5 shows an edit screen of the spreadsheet function.

FIG. 5 shows an edit screen used during the execution of the spreadsheet function. Menu cursors are arranged and displayed such that one of six functions in the editing of a chart is started by the selection by the function key.

Figure 6:
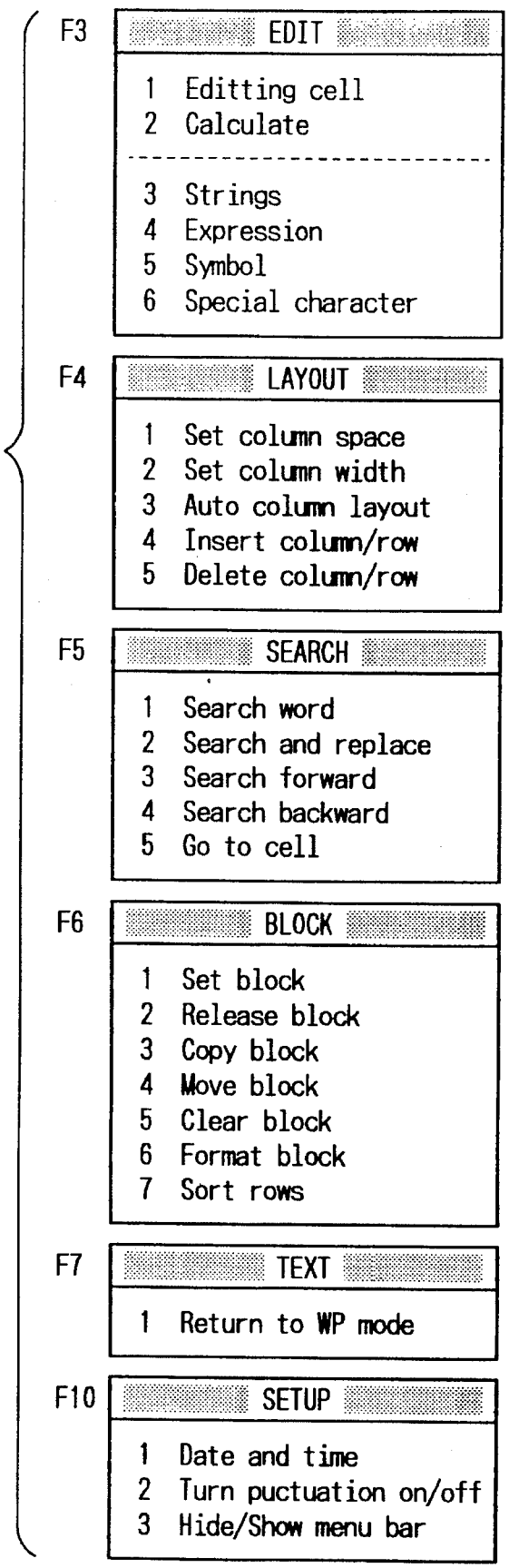
FIG. 6 shows an edit menu of the spreadsheet function.

FIG. 6 shows menu boxes for the six functions. The function started by the function key F3 relates to data entry into the chart. It is selected when data other than numerals is to be set. The function key F4 is used for the chart format and the addition and deletion of rows and columns, and the function key F5 is assigned to a search function of a specific character from the entire chart.

The function key F6 is assigned to a blocking process for copying, moving, erasing or modifying an entire chart or a portion of a chart to facilitate the editing of the chart.

The function key F7 is used to immediately return to the control of the word processing, that is, the editing of the document, and the function key F10 is used for setting data and taking a unit of a numeral.

A process of merging chart data into a text by using the keyboard and the menu boxes is now explained with reference to FIGS. 7–10.

Figure 7:
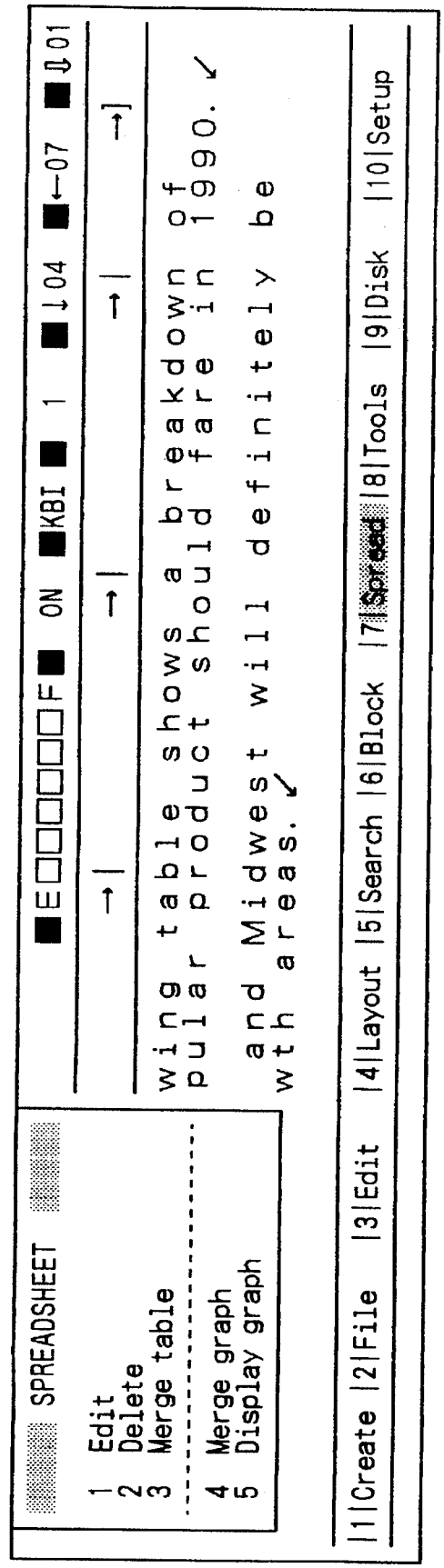
FIG. 7 shows a main menu of the spreadsheet function used in editing a text.

FIGS. 7–10 show display screens in the process of preparing a chart during the editing of a text and merging it into the text. When the key F7 is depressed during the editing of the text, the spreadsheet function is started and the menu box of FIG. 7 is displayed. When "merge table" in the menu is selected, the spreadsheet function is started and the screen shown in FIG. 8 is displayed. In FIG. 7, a new chart may be prepared by selecting "edit". In the present embodiment, merging of chart data into the text permits one chart data for one file, and a desired data block is designated from the data to store it as character data together with the text. Accordingly, only the merging of the preexisting chart data into the text is explained in the present embodiment.

FIG. 8 shows a screen which displays data for permitting the user to set an area required for the chart. Rows 3 to 7 are set as the merge area.

FIG. 9 shows a screen after the designated chart data area has been merged into the text. It is merged in the same format as the text data.

Figure 10A:
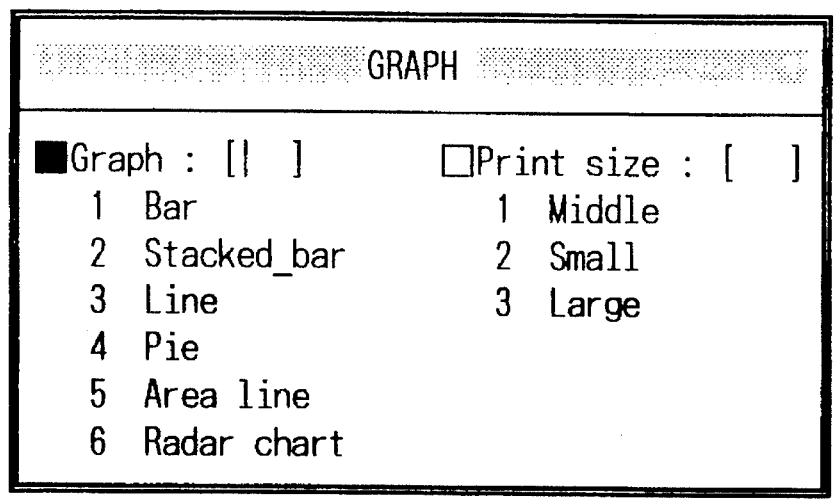
FIGS. 10A and 10B show a graph menu and a sample of a pie graph.
Figure 10B:
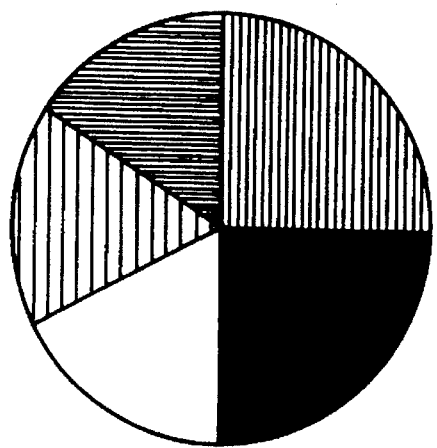

FIGS. 10A and 10B show displays of a menu box and a pie graph when a graph is to be prepared in a text. In the present embodiment, one of six graphs, bar graph, stacked bar graph, line graph, pie graph, area line graph and radar chart can be selected. The size of graph to be printed is also selected by the menu box. In the pie graph, for example, a circle having a radius of 2 inches is printed by selecting "Middle", a circle having a radius of 1.25 inches by selecting "Small", and a circle having a radius of 2.25 inches by selecting "Large".

FIG. 11 shows setting of a scope of graphing of the table data in the preparation of a graph in the present embodiment. In the present example, occupancy proportions of countries A–E in 1988 are set as the scope of graphing. A pie graph is most suitable to represent proportions of the entire data.

FIG. 12 shows a change of occupancy proportions ratios in 1980–1988 in the country C. A line graph or bar graph is most suitable to represent a time shift of the data and an overall trend of the data.

Figures 13, 14:
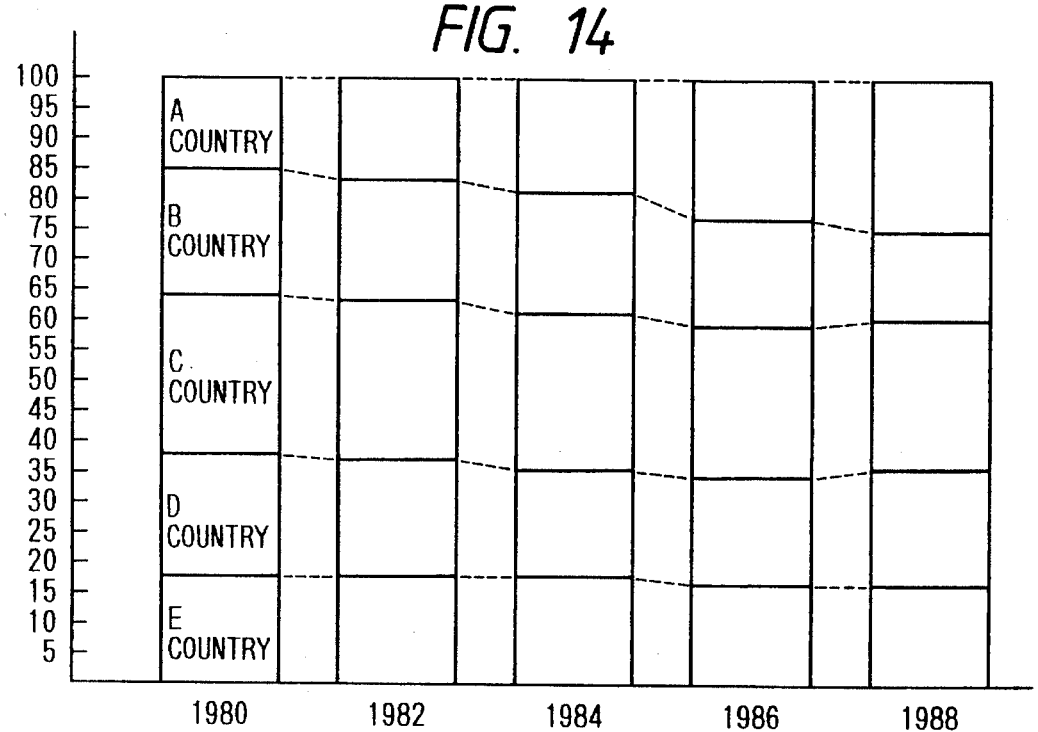
FIG. 13 shows a third example for setting a range in the spreadsheet function.
FIG. 14 shows a stacked bar graph.

FIG. 13 shows setting of a range when a plurality of rows each comprising a plurality of cells are to be graphed. In this case, when it is to be represented by a pie graph, it is necessary to use a five-layer pie graph or prepare five pie graphs. However, many environment settings are needed to prepare those graphs and it is a big burden to the user with the present conventional interface and it is not worth while to load it in the word processor as a table application or graph utility.

However, when a stacked bar graph or a stacked line graph is used to graph those lines, each comprising a plurality of cells, it is possible to represent a comparison of time shift of the items which the table data represents.

FIG. 14 shows a stacked bar graph (band graph) of the data set in FIG. 13. From the graph, an occupancy proportion of the countries and yearly changes thereof are clear. To graph one item or one row of data, a pie graph which is easy to compare the proportion in the overall in the selected range, or a bar graph or line graph which can represent the time shift of the data is suitable.

On the other hand, to graph the data of a plurality of rows each comprising a plurality of item data, the pie graph, bar graph or line graph is not suitable because they cannot represent all of the data. However, the stacked graph or area graph can represent a number of data.

It is an object of the present invention to automatically set selection items which comprise only the graph forms which fit to the format of the data to be graphed in the range designated by the user so that logical mis-selection is prevented in the selection of graph form and release the user from troublesome decision making. In order to achieve the above object in the present embodiment, the data format in the range of graphing designated by the user is recognized by the numbers of vertical and horizontal items and the result of recognition is reflected to the selection menu in the selection of the graph form.

A process flow of the present embodiment is explained with reference to FIG. 15.

Figure 15:
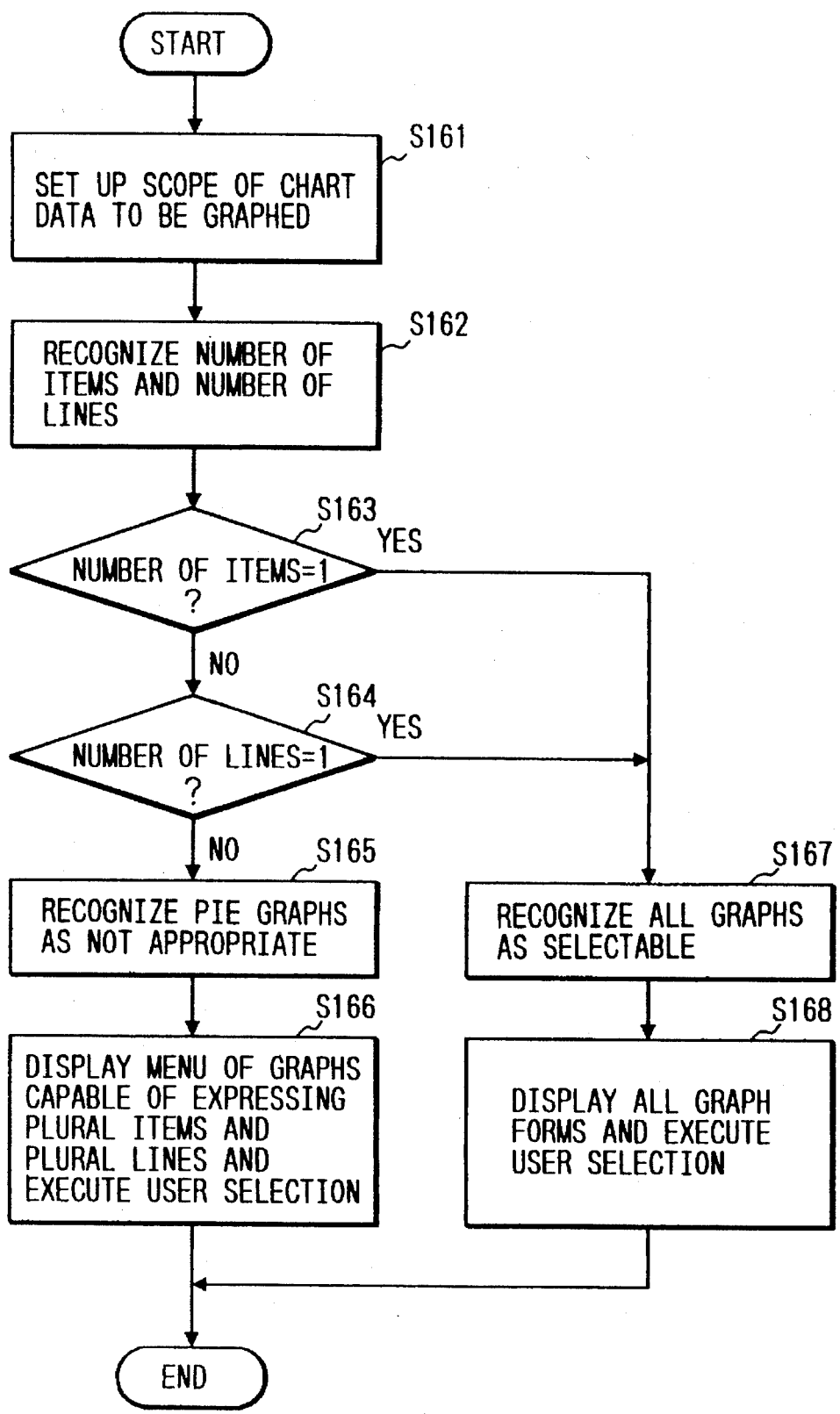
FIG. 15 shows a flow chart of a process according to the invention.

FIG. 15 shows a flow chart of the process in the present embodiment. In a step S161, a range of data to be graphed in the displayed table data is set. This screen sets the range as shown in FIGS. 8, 11, 12 and 13.

In a step S162, the number of horizontal items and the number of vertical items in the designated range of the data are recognized. In FIG. 11, the number of horizontal items is 1 and the number of vertical items is 5. In FIG. 13, the number of horizontal items is 5 and the number of vertical items is 5.

In a step S163, whether the number of horizontal items recognized in the step S162 is 1 or not is determined. If it is "1", it is determined as a one-dimensional data string and YES decision is made. Then, the process proceeds to a step S167 to present all graph forms as the candidates.

When there are a plurality of horizontal items as shown in FIG. 13, NO decision is made and the process proceeds to a step S164 to determine whether the number of rows is 1 or not. If it is 1, it is recognized as a one-dimensional data string even if there are a plurality of horizontal items. Thus, the process proceeds to a step S167.

By determining whether the number of horizontal items or the number of vertical items is 1 or not, the decision is made in the steps S163 and S164 as to whether the process proceeds to the step S166 or the step S168.

In the step S166, since the range of data comprises the plurality of rows and the plurality of columns, a menu of graph forms excluding those graph forms such as pie graph which cannot express the two-dimensional data is displayed.

In the step S168, since the data format has been recognized as one-dimensional, any graph form may be selected and all graph forms available in the system are displayed in the menu.

Figure 16:
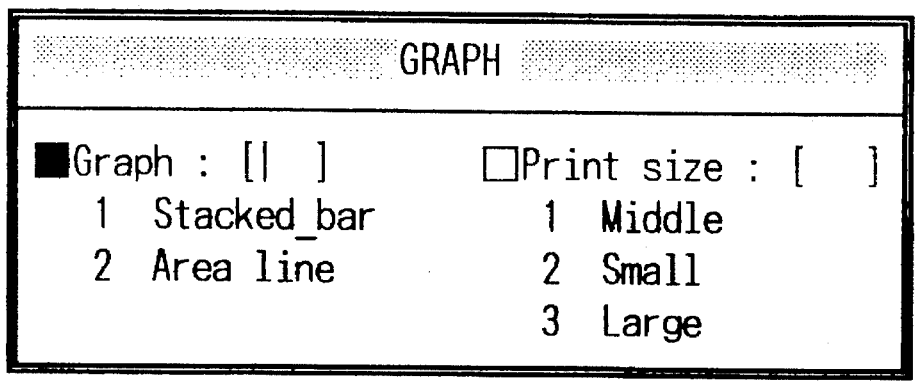
FIG. 16 shows a menu having inexecutable graphs deleted.
Figure 17:
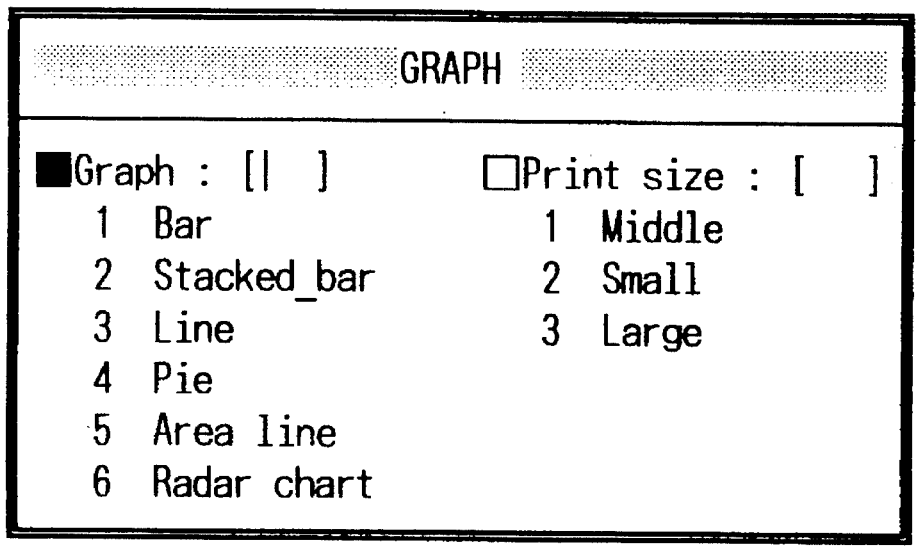
FIG. 17 shows a menu having only executable graphs.

The graph selection menus displayed in the present embodiment are shown in FIGS. 16 and 17. FIG. 16 displays only the stacked bar graph and stacked line graph which are executable when the data comprises a plurality of rows and a plurality of columns, and FIG. 17 displays all of the six graph forms because the data is one-dimensional, that is, the number of rows or columns is 1.

The present embodiment is implemented in the system which handles a spreadsheet function data structure and coexistence data structure with text data. Accordingly, a linear data stream is recognized as table data having a plurality of rows, and the number of cells and the number of rows of the data to be graphed are recognized in accordance with the range designated by the user to determine whether it is an executable graph or not. Alternatively, in a spreadsheet function which manages data other than text data or a system which handles all input table data as candidates to be graphed, the selection items which do not include a nonexecutable graph menu can be set by the graph form determination means of the present invention.

In this case, the drawings of the first embodiment and the flow chart of FIG. 15 are applicable as they are except that the number of cells and the number of rows of all files are used as the references for determination.

In the above embodiment, the data to be graphed is recognized by the user designation of the range in the recognition of the scope. Alternatively, the recognition means may recognize it through range designation means in the system.

In such a system, the fixed recognition is usually carried out until the user instructs a change of utility. Thus, an easier system can be provided to the user than the system of the first embodiment in which the scope of graphing is set by moving the cursor while the table data is displayed.

When the data to be graphed always has a constant number of data, for example, when an annual sales graph by month of one commodity is to be updated, the graph may be prepared based on desired data without separately setting the range.

In the above embodiment, the misselection of a graph is avoided by deleting the graph forms which have been determined as nonexecutable by the recognition of the range, from the selection items for the user. Alternatively, whether the data is nonexecutable or not may be determined by program simulation in each graph, and if the graph cannot be down, it may be informed to the user that the graph form cannot be selected.

In this case, finer data recognition and graph selection are attained and the graph which the user most desires can be exactly selected.

However, a system environment of a higher speed is required because a number of graph forms must be determined for a large volume of data.

In accordance with the present invention, the executable graphs can be displayed in the menu by recognizing the numbers of vertical and horizontal items and the number of rows of data in setting the range of data to be graphed so that the user can select a desired one. Accordingly, there is no risk that a desired graph is not drawn, a blank screen is displayed or a blank sheet is printed, and an appropriate graph is always prepared.

EMBODIMENT 2

In the above embodiment, whether the graph form is executable or not is determined by a common criterion of whether any one of the number of items and the number of rows of the data is 1 or not. In the present embodiment, a separate criterion is set for each of the graph forms to determine the fitness of the form. In the present embodiment, only the graph forms which fit the data format are used as the selection items in the selection screen of the graph format and layouts of the graph formats are displayed. Accordingly, the user can select a most appropriate graph form by referencing the layouts.

A control operation of the CPU 101 to attain the above operation is now explained with reference to FIG. 18.

Figure 18:
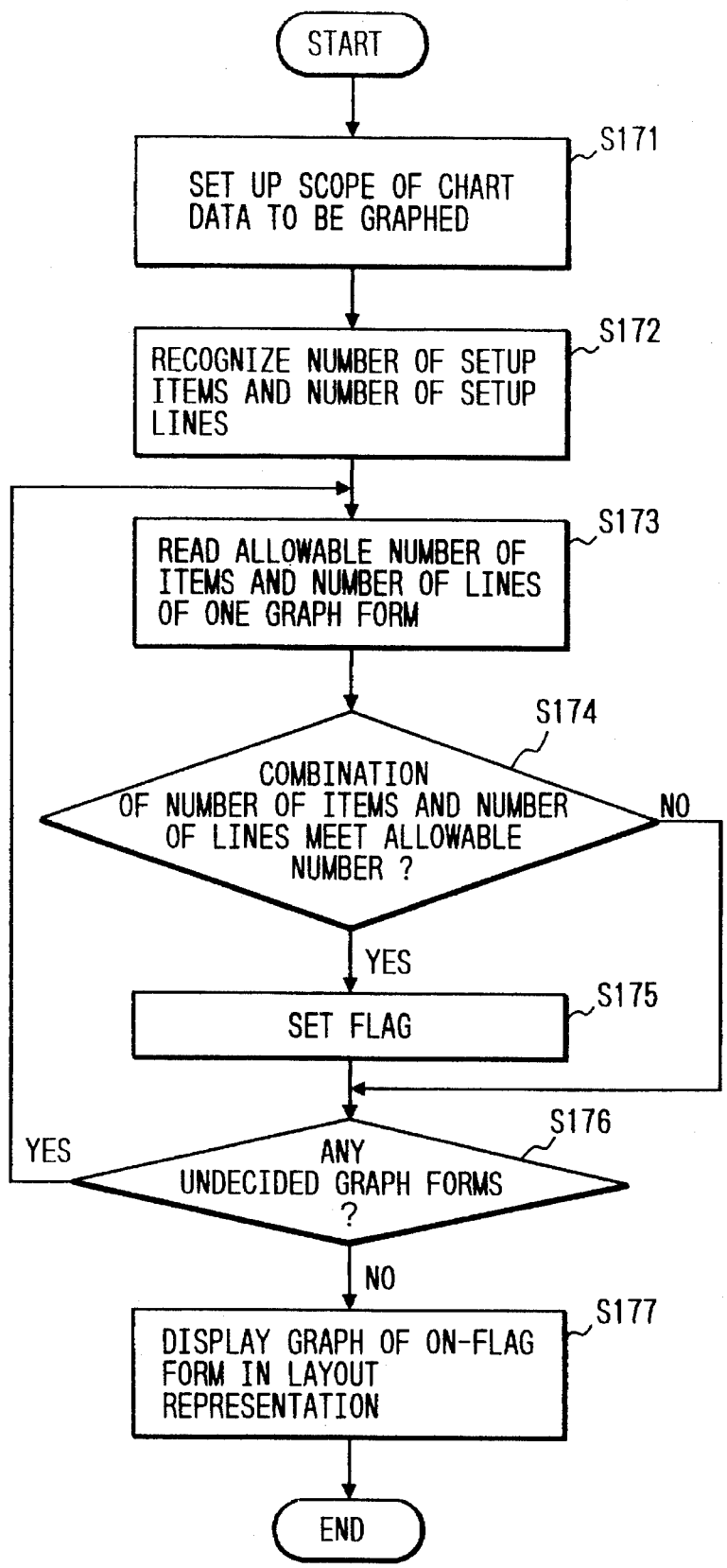
FIG. 18 shows a flow chart for determining the fitness of a graph form in a second embodiment.

The user sets the range of data to be graphed as shown in FIGS. 13–15 (step S171 in FIG. 18). The CPU 101 stores the designated data into the CDT area 112 of the memory 111. The CPU 101 then counts the number of horizontal items and the number of vertical rows (step S172). Then, the CPU 101 sequentially reads, for each graph form, the reference data, that is, the permissible number of horizontal items and number of vertical rows for each graph type, from the FMT area 115 of the memory 111, and compares them with the counts (steps S173–S174).

For the graph types whose counts are within the permissible limits, flags in the work areas 111 which are provided one for each of the graph types are set (steps S174–S175). The decision is made for all graph forms (steps S176–S173).

When the CPU 101 detects the graph form having the flag set, it prepares layout display information for the graph data for that graph form and displays it on the DSP 104 (step S177). The CPU 101 now functions as the image processing means of the present invention.

Figure 19:
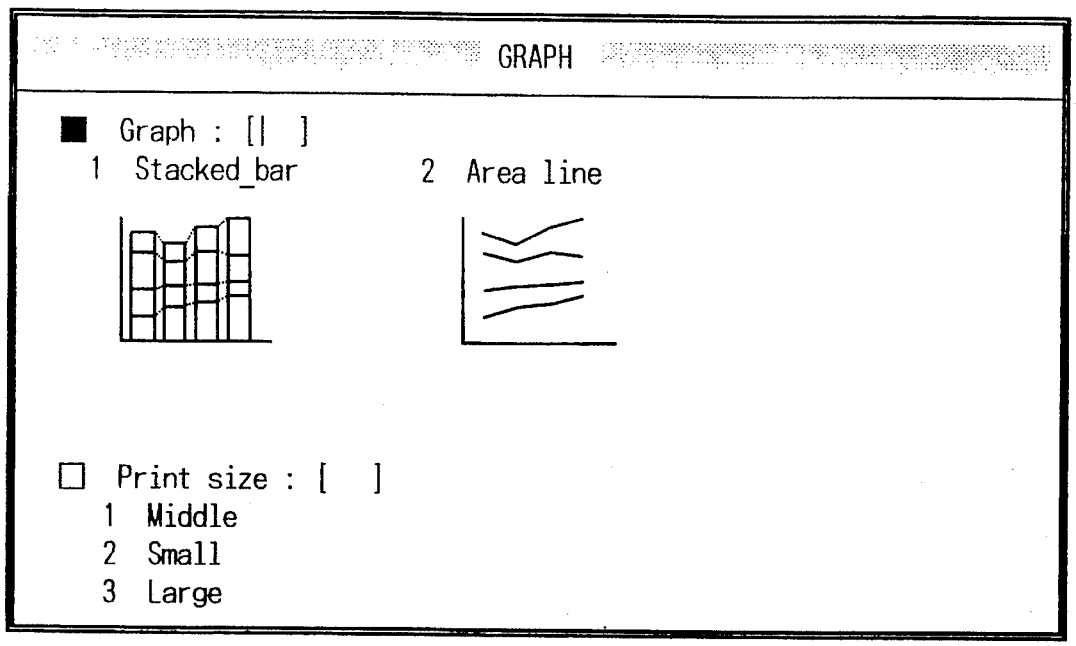
FIGS. 19 and 20 show a display screen in a graph form selection step.
Figure 20:
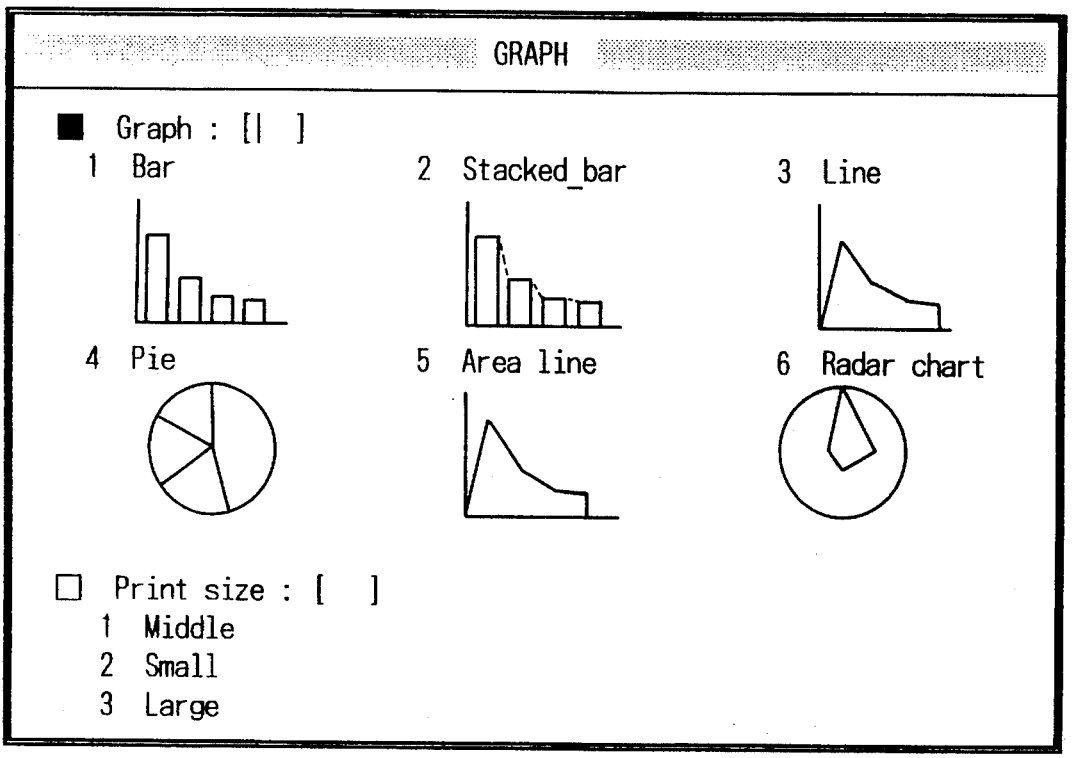

FIG. 19 shows a display of a selection screen when it has been determined that two graph formats fit, like in FIG. 16, and FIG. 20 shows a display when all graph forms fit.

When the user enters the same number from the keyboard 102 as the number assigned to the selection item on the display screen to designate the form and the size of the graph to be printed, the graph is prepared in accordance with the designated form and size.

In the present embodiment, if one-raw data has more than a predetermined number of items, a radar chart may be determined as not appropriate, and if the number of rows is 1 assuming the lateral direction as a time axis, a pie graph may be determined as not appropriate.

EMBODIMENT 3

Figure 21:
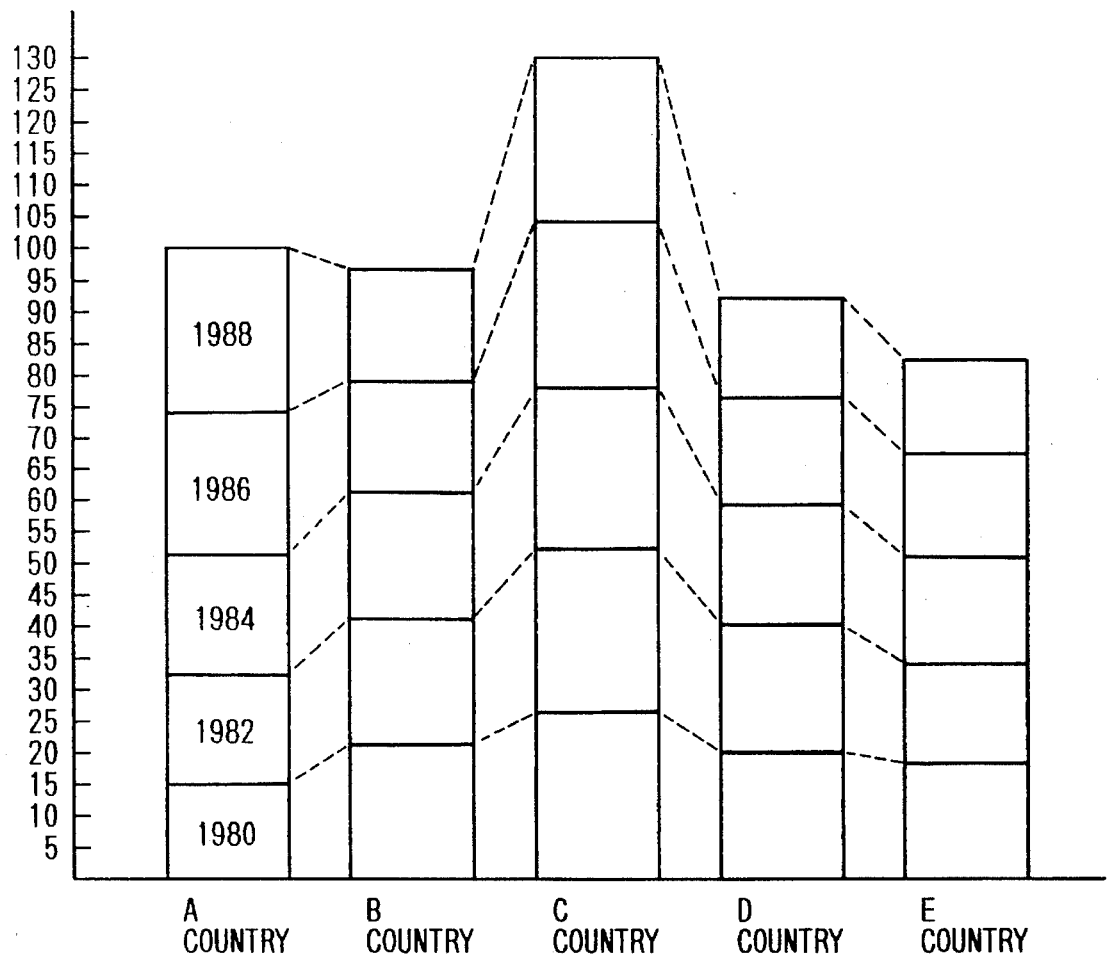
FIG. 21 shows another form of stacked bar graph.

In FIG. 14, the table data is represented by the stacked bar graph (band graph). The occupancy proportions and the changes by year in the respective countries are clear from FIG. 14. However, graphs prepared based on the two-dimensional table data having a plurality of items and a plurality of rows as shown in FIG. 13 may includes, in addition to the graph form shown in FIG. 14, a graph form as shown in FIG. 21 in which the vertical and horizontal directions are reversed. Since the stacked bar graph of FIG. 21 makes no sense to the data of the table which indicates the change by year of the occupancy proportions in the respective countries, it is clear that it is not the one which the user intended to use. When the two-dimensional table data simply defined by the items and the rows is handled, the stacked-bar graphs of FIGS. 14 and 21 are both determined to fit the data in the system. However, when the stacked bar graph of FIG. 21 is selected, the user must take corrections.

In the present embodiment, in order to prevent the misselection of the most appropriate graph form to the range designated by the user for each graph type, the executable graph shapes and the layouts of the graphs are displayed when a plurality of graph forms are executable to one graph form in order to relieve the user from a troublesome trial and error process.

A process in the present embodiment is explained with reference to a flow chart of FIG. 22.

Figure 22:
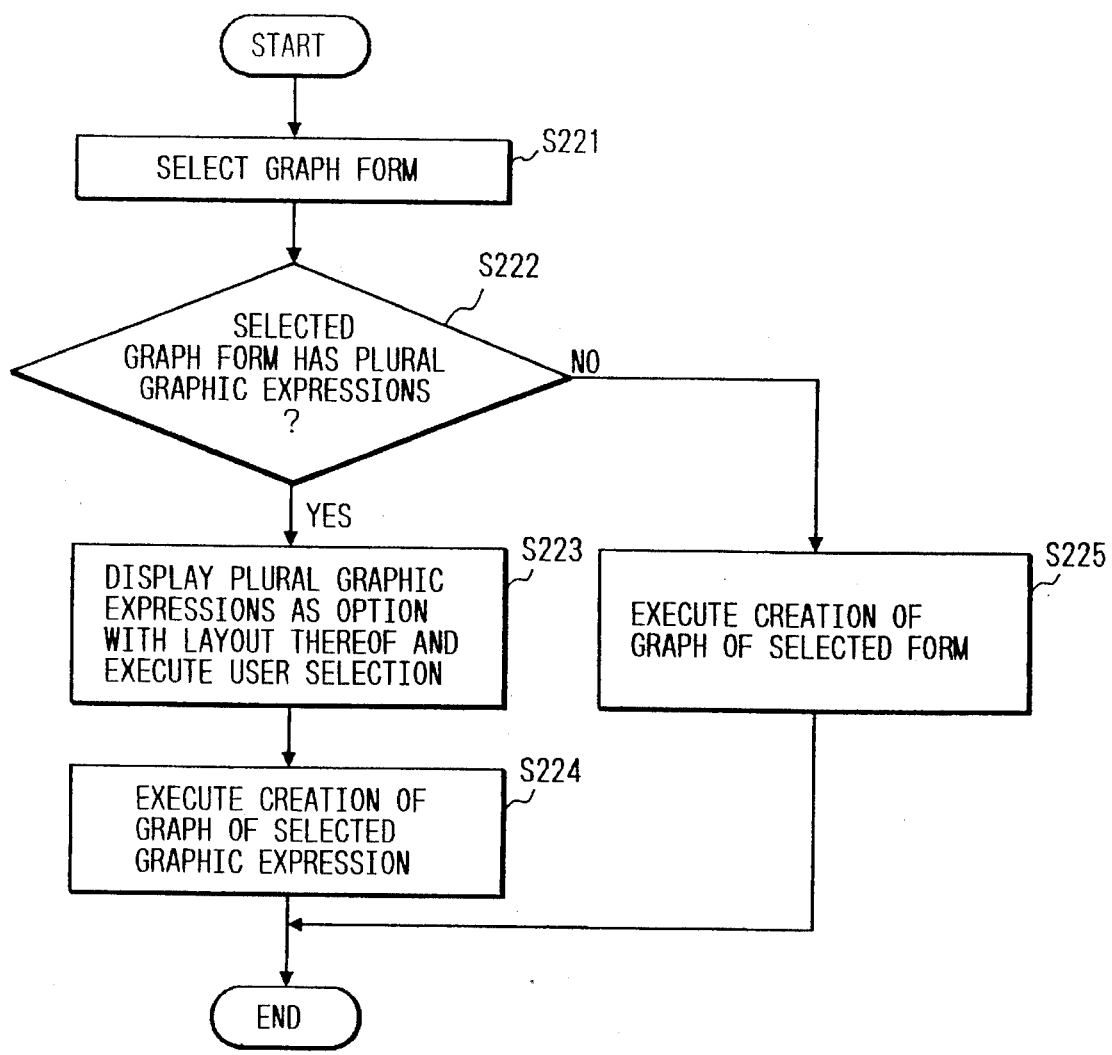
FIG. 22 shows a flow chart of a graph form selection step in a third embodiment.

FIG. 22 shows a flow chart of the execution process of the CPU 101 in the present embodiment.

In a step S221, a graph form is selected. It is selected in accordance with the graph form selection screen which is executed in accordance with the flow chart of FIG. 18 explained relative to embodiment 2.

In a step S222, whether the graph form selected in the step S221 has a plurality of graphic expressions or not is determined. In this case, the stacked-bar graph and the stacked line graph of the six graph forms have expressions, respectively, which the other forms do not. Instead of determining for the selected form, it may be determined that there are two graphic expressions if two-dimensional data is detected based on the recognition of the data form in step S172 in FIG. 18.

Figure 23:
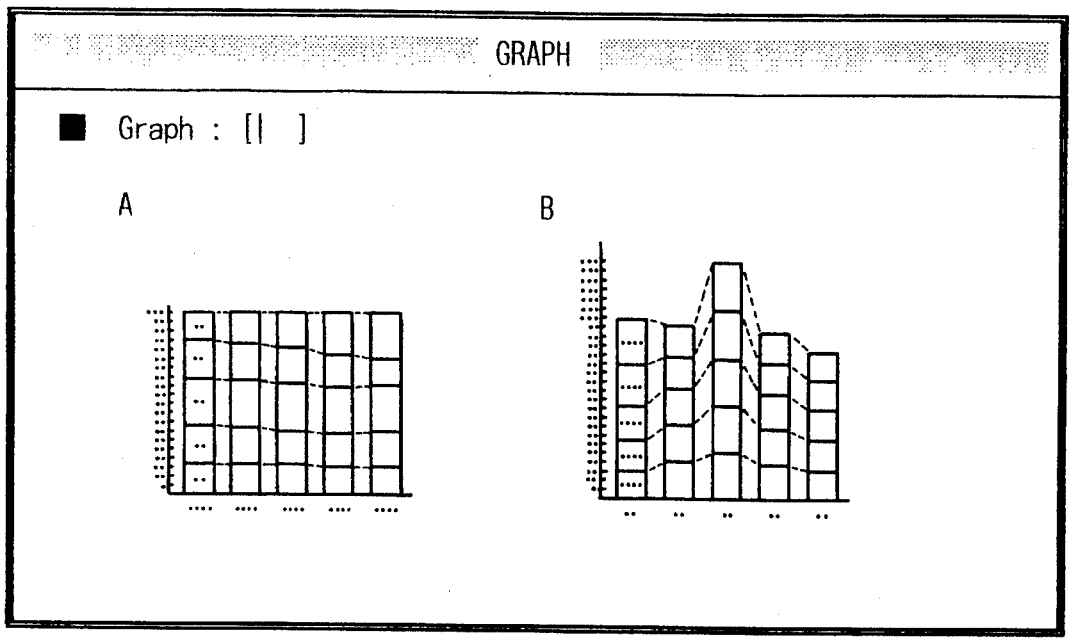
FIG. 23 shows a display screen of the graph form selection step.

In a step S223, since a plurality of graphic expressions are included, the respective expressions as well as layouts thereof, are displayed as shown in FIG. 23 so that the user can select a desired graphic expression while he/she refers the layouts. In FIG. 23, an option A corresponds to FIG. 14 and an option B corresponds to FIG. 21. In a step S224, a graph of the selected graphic expression is prepared.

On the other hand, if the selected graph form has only one graphic expression, a graph of the selected graph form is prepared in step S225 as, the case in the previous embodiment.

EMBODIMENT 4

In the above embodiment, the size of a graph to be prepared may be selected. In the present embodiment, when the size is to be selected, the size of the graph in the print-out medium is displayed by the layout so that the user can select a most appropriate size by comparing the layouts of the respective sizes. When the graph is to be merged into a text, a ratio of the sizes of the text and the graph after the merge can be predicted.

Accordingly, the misselection of the graph size of the user is avoided and the user is relieved from a troublesome process to determine an appropriate graph size.

The process of layout display is explained with reference to a flow chart of FIG. 25.

When a graph form is selected by a numeric key of the keyboard 102 while the screen of FIG. 17 is displayed, the CPU 101 reads data indicating the size of a record sheet (for example, a longitudinal size A4) stored in the FMT area 115, prepares dot patterns for displaying the layout of the text under editing in accordance with the longitudinal size A4 of the record sheet, and stores it in the VDT area 116 of the memory 111 (steps S251–S252 in FIG. 25). This may be accomplished by a known layout display method and a detailed description thereof is omitted. In the present embodiment, a plurality of layout patterns are prepared one for each size.

The CPU 101 then prepares dot patterns of large, middle and small graph layouts in the selected graph form based on the table data stored in the CDT area of the memory 111. The size of the graph layout dot pattern is determined for each designated graph size such that a ratio of the sizes of the image of the record sheet and the image of the graph on the display screen is equal to a ratio of the sizes of the actual record sheet and the image of the graph on the record sheet.

Thus, the relative size relationships of the graph image and on the record sheet the display screen are equal so that the user can check the size of image on the record sheet.

Then, the CPU 101 merges the dot patterns of the respective sizes into the text layout patterns of the respective sizes in accordance with the record positions on the record sheet and stores them in the VDT area of the memory 111 (step S253 in FIG. 25).

Figure 24:
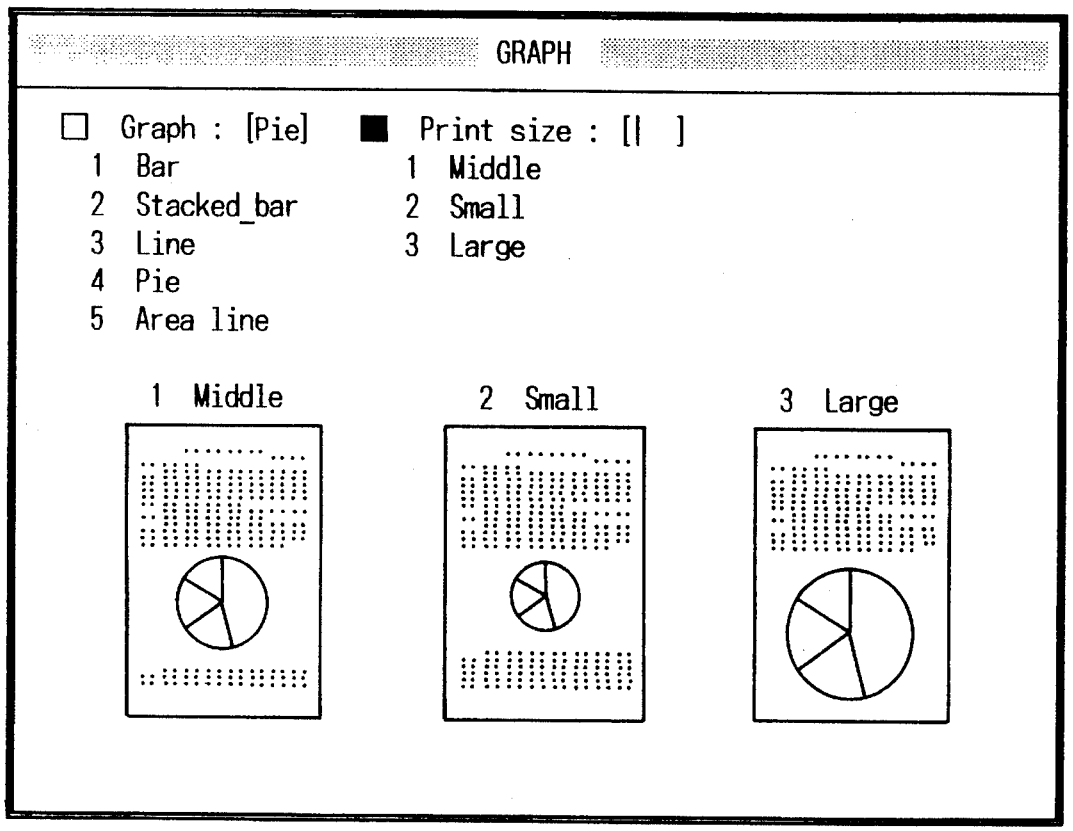
FIG. 24 shows a display screen of a graph size selection step.

Then, the CPU 101 reads the dot patterns for the record sheet and the graph layout stored in the VDT area 116 and transfers them to the display controller 103 to simultaneously display graph layouts of various sizes on the display screen as shown in FIG. 24 (step S254). The user selects a graph size to be printed while watching the display screen.

Since the user can previously check the page layouts which could be attained by printing in the respective size, in the step of graph size selection, he/she can select a most appropriate graph size and misselection of the graph size by the user is totally avoided.

In the present embodiment, the layouts of the respective graph sizes are displayed in accordance with the page format of the text data. Such layouts cannot be displayed for all graph sizes. If the layout cannot be displayed in one page, it may be eliminated from the size option and the page layout may not be displayed. In this manner, the misselection may be further avoided. As an example, left and right margins in the text format data are smaller than the lateral graph size of the large size. In this case, only one graph size may be set and there is no room for the user to select the size or the selection process is skipped, although it is merely one status in displaying the graph layouts of a plurality of sizes, which is at the heart of the present invention.

In the present embodiment, the layouts of the respective sizes are displayed for the graph forms selected by the user. In the selection of the graph form in the Embodiment 2, the layouts may be displayed for all graph forms and the user may select while watching the displays. In such a case, the selection of the graph form and the selection of the graph size may be done simultaneously. As an example, only the executable graphs may be displayed by the layout and three kinds of sizes times six kinds of graphs (equals 18) may be displayed by layout. All of 18 graphs may be displayed and non-executable graphs may be displayed in half-tone to distinguish them. In any case, the finer data recognition and size selection including the graph selection are attained and the graph which the user must wants can be exactly selected. However, a faster system environment is required because a number of graphs should be determined for a large volume of data.

In accordance with the present invention, since the page layouts for the respective graph sizes are displayed, the outline of the graph on the record sheet can be visually checked as the page image before printing. Accordingly, a burden to the user that the user must prepare a graph while he/she thinks about the image of the page on which the graph is merged is eliminated and the user can merge the graph of the optimum size into the page.

What is claimed is:

1. A method of making a graph on a form selected from a plurality of predetermined graph forms, comprising the steps of:

preparing data in a table format in a table;

determining whether or not each of the predetermined graph forms is able to be used for representing prepared data in the table on a graph;

simultaneously displaying identifiers for the plurality of predetermined graph forms as candidates for a selection by a user, except for those which were determined not able to be used;

selecting one of the predetermined graph forms according to an identifier selected by the user from among the displayed identifiers; and making a graph on the selected graph form based on the prepared data.

2. A method of making a graph according to claim 1, wherein said step of determining is performed in accordance with the numbers of columns and rows of the table.

3. A method of making a graph according to claim 2, wherein said step of determining includes the step of discriminating whether or not a number of a column is one.

4. A method of making a graph according to claim 2, wherein said step of determining includes the step of discriminating whether or not a number of a row is one.

5. A method of making a graph on a form selected from a plurality of predetermined graph forms, comprising the steps of:

preparing data in a table format;

designating a range of prepared data in a table format to be graphed;

determining whether or not each of the predetermined graph forms is able to be used for representing the prepared data in the designated range on a graph;

simultaneously displaying identifiers for the plurality of predetermined graph forms as candidates for a selection by a user, except for those which were determined not able to be used;

selecting one of the predetermined graph forms according to an identifier selected by the user from among the displayed identifiers; and making a graph on the selected graph form based on the prepared data in the designated range.

6. A method for making a graph according to claim 5 wherein said determination step determines whether the data in the designated range is one-dimensional data or two-dimensional data and determines a graph form incapable of two-dimensional expression as not suitable.

7. A method for making a graph according to claim 6 wherein said plurality of graph forms include a pie graph, and said determination steps determines the pie graph as not suitable for a two-dimensional expression when the data in the designated range is two-dimensional data.

8. A method of making a graph on a form selected from a plurality of predetermined graph forms, comprising the steps of:

preparing data in a table format;

recognizing a range of prepared data in the table format to be graphed;

determining whether or not each of the predetermined graph forms is able to be used for representing the prepared data in the recognized range on a graph;

simultaneously displaying identifiers and outlines of the plurality of predetermined graph forms as candidates for a selection by a user, except for those which were determined not able to be used;

permitting the user to specify a desired identifier from among the displayed identifiers;

selecting a graph form according to the identifier specified by the user; and making a graph on the selected graph form based on the prepared data in the recognized range.

9. A method for making a graph according to claim 8 wherein the entire prepared data in the table format is recognized as the range to be graphed.

10. A method for making a graph according to claim 8 further comprising the step of designating a range of the prepared data in the table format to be graphed, wherein said recognition step recognizes the data in the table format in the recognized scope as the scope to be graphed.

11. A method for making a graph according to claim 8 further comprising the steps of:

determining whether a plurality of expression manners are permitted or not for the selected graph form;

simultaneously displaying a plurality of layout images by the plurality of expression manners when such plurality of expression manners are permitted; and permitting a selection of a desired expression manner during the display.

12. A method of printing a graph in a size selected from a plurality of graph sizes, comprising the steps of:

setting a size of an output medium;

preparing data in a table format;

recognizing a range of the prepared data in the table format to be graphed;

simultaneously displaying a plurality of graph layout images to be output to the output medium in the plurality of graph sizes based on the data in the recognized range;

permitting the selection of a desired graph size during the display; and making a graph of the selected graph size based on the prepared data in the recognized range.

13. A method for printing out a graph according to claim 12, further comprising the steps of:

determining whether or not each of the graph sizes is able to be used for representing the prepared data in the recognized range on an output medium, with the plurality of graph layout images being displayed in said displaying step, except for those which were determined not able to be used.

* * * * *

UNITED STATES PATENT AND TRADEMARK OFFICE
CERTIFICATE OF CORRECTION

PATENT NO. : 5,611,034

DATED : March 11, 1997

INVENTOR : MASARU MAKITA

Page 1 of 2

It is certified that error appears in the above-identified patent and that said Letters Patent is hereby corrected as shown below:

ON TITLE PAGE

[54] "FIT" should read --FITS--.

COLUMN 1

Line 3, "FIT" should read --FITS--;
  Line 63 "of" should read --of:--.

COLUMN 4

Line 23, "entire" should read --entirety--;
  Line 42, "VIF 112" should read --UIF 122--;
  Line 54, "a key F1-F5" should read --keys F1-F5--.

COLUMN 7

Line 35, "scope." should read --range.--;
  Line 42, "scope" should read --range--;
  Line 55, "down," should read --executed--.

UNITED STATES PATENT AND TRADEMARK OFFICE
CERTIFICATE OF CORRECTION

PATENT NO. : 5,611,034

DATED : March 11, 1997

INVENTOR : MASARU MAKITA

It is certified that error appears in the above-identified patent and that said Letters Patent is hereby corrected as shown below:

```
COLUMN 8

Line 62, "includes" should read --include,--.

COLUMN 9

Line 41 "as, the case" should read --as--.

COLUMN 10

Line 58, "must" should read --most--.

COLUMN 11

Line 57, "steps" should read --step--.
```

Signed and Sealed this

Sixteenth Day of September, 1997

*Attest:*

BRUCE LEHMAN

*Attesting Officer*         *Commissioner of Patents and Trademarks*